B. TINKHAM.

Improvement in Cultivators.

No. 4,600. Reissued Oct. 17, 1871.

*Witnesses.*
A. Ruppert,
C. F. Clausen

B. Tinkham
*Inventor.*
D. P. Holloway & Co
Atty

AM. PHOTO-LITHOGRAPHIC CO. N.Y. (OSBORNES PROCESS.)

UNITED STATES PATENT OFFICE.

BENJAMIN TINKHAM, OF CAMERON, ASSIGNOR TO HAPGOOD & CO., OF CHICAGO, ILLINOIS.

IMPROVEMENT IN CULTIVATORS.

Specification forming part of Letters Patent No. 30,897, dated December 11, 1860; reissue No. 4,231, dated January 10, 1871; reissue No. 4,600, dated October 17, 1871.

*To all whom it may concern:*

Be it known that I, BENJAMIN TINKHAM, of Cameron, in the county of Warren and State of Illinois, have invented certain new and useful Improvements in Cultivators; and I do hereby declare that the following is a full, clear, and exact description thereof, reference being had to accompanying drawing making part of this specification and to the letters of reference marked thereon, like letters indicating like parts wherever they occur.

To enable others skilled in the art to construct and use my invention I will proceed to describe it.

My invention relates to implements used for cultivating growing crops, such as corn, potatoes, &c.; and the invention consists in a new and improved combination of devices whereby convenient supports are provided for suspending the plow-beams with their gangs of plows clear above the ground when not in use, and whereby greater strength and rigidity is imparted to the tongue and axle or truck-frame. This desideratum I accomplish by bracing the tongue with two bars which are rigidly secured to the axle, and whose rear ends are projected beyond and in rear of the axle a sufficient distance to afford a support for the plow-beams when lifted up in the manner hereinafter specified.

Figure 2:
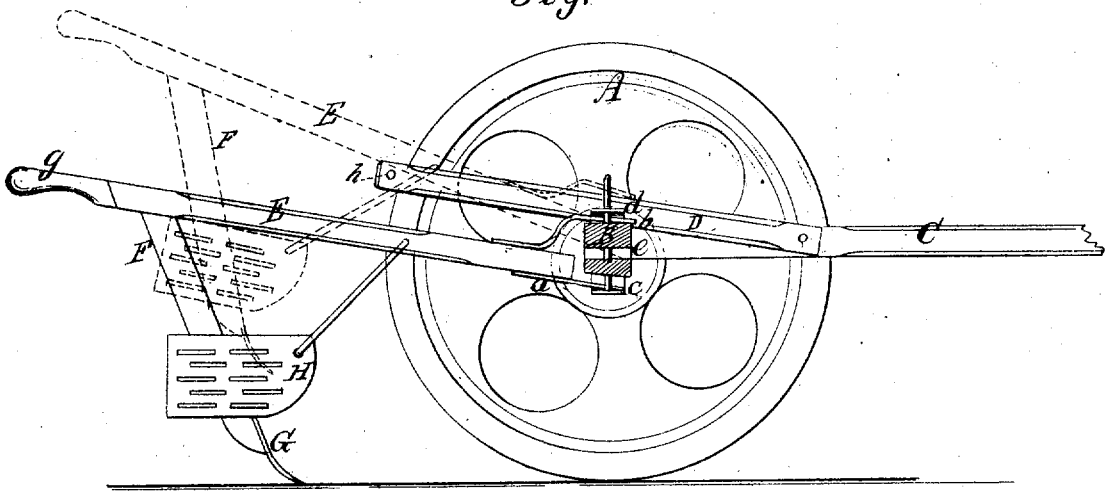
Figure 1:
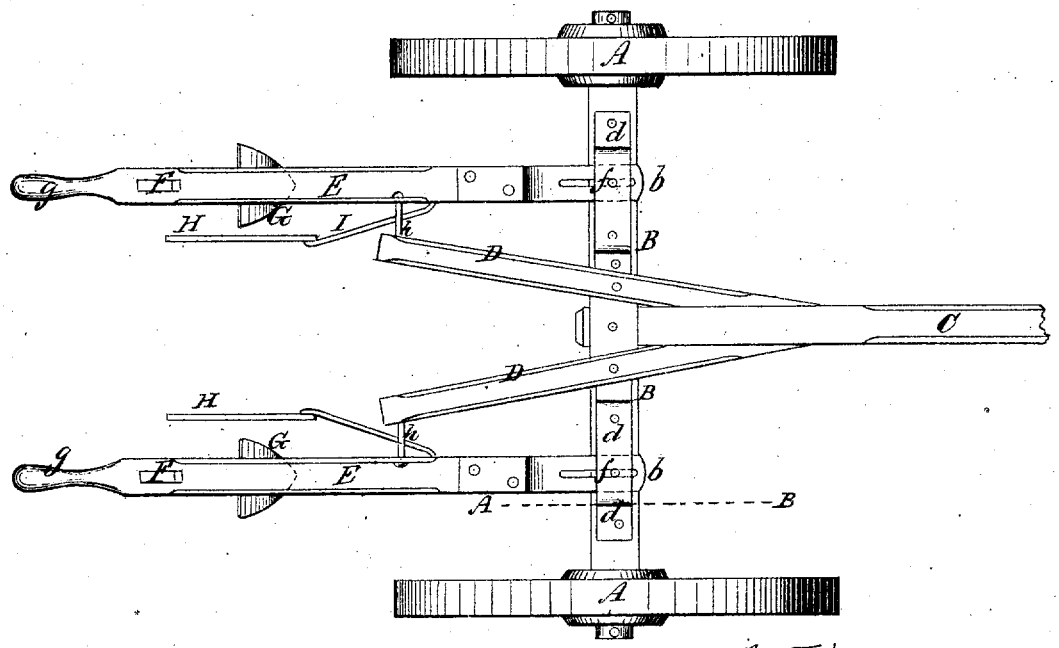

Figure 1 is a top plan-view, and Fig. 2 a longitudinal vertical section of a cultivator embodying my improvement.

In constructing a cultivator according to my plan I take an axle, B, and mount it on two wheels, A, like a cart. To this axle B I secure a tongue, C, by a rigid connection, and brace the tongue to the axle by means of two diagonal bars or braces, D, which have their rear ends projecting some distance behind the axle, as shown in Figs. 1 and 2. At their rear ends these bars D are each provided with a laterally-projecting pin, *h*, for the purpose of holding the beams E suspended when the shovels are raised from the ground, as represented by the dotted lines in Fig. 2. In the beam B, on each side of the tongue, I make a horizontal slot or mortise, *e*, as shown in section in Fig. 2, said section being taken on the line A B of Fig. 1. To the upper side of the beam over each slot *e* I then secure a bent plate, *d*, this plate being secured at each end rigidly to the beam, but being raised clear of the beam between its ends so as to make between it and the beam a space or slot similar to the slot *e* in the beam. To the under side of the beam I also secure plates *c*. Through these plates and the axle I make a series of vertical holes of proper size to receive a pin or bolt, *f*, as shown in Fig. 2. I then provide two beams, E, of suitable size to attach the shovels G to in the usual manner; and to the front end of each beam I secure two plates, *a* and *b*, as shown in Figs. 1 and 2. These plates are long enough and of proper size to fit loosely in the slots in the beam and those between the beam and the plates *c* and *b*. The upper plate *b* is provided with a longitudinal slot, as shown in Fig. 1, of proper width to receive the pin *f*, and the lower plate *a* is provided with a hole, also of suitable size to receive the pin *f*. The beams are connected to the axle by inserting the plates *a* and *b* into the slots, as shown in Fig. 2, and then putting the pin *f* down through the holes in the plates *a* and *b*, and also through the holes in the plates *c* and *d* and axle B, thus hinging or pivoting the beams to the axle at their front ends. When thus attached the beams can be swung or moved laterally at their rear ends, they turning on the pin *f* freely. By means of the slot in the upper plate *b* they can also be raised vertically at their rear ends, the slot in said plate permitting the same to play forward and backward on the pin *f* as the rear end of the beams are raised or lowered, as represented by the dotted lines in Fig. 2. At the same time, while the beams have these free lateral and vertical movements, they are held firmly in an upright position, and prevented from tipping, twisting, or canting over sidewise; and thus the necessity of uniting the two beams by cross-ties, braces, or frames of any kind to keep them upright is dispensed with. By means of the series of holes for the pins *f* the beams can be adjusted laterally to suit rows of various widths, and by inserting the plates *a* and *b* in the different slots of the axle their front ends may be raised or lowered, and thus the shovels made to run deeper or shallower, as desired. Alongside of the shovels G are secured shields or guards H, which are provided with slots or openings through which the finer particles of soil may pass to the plants, while the lumps, clods, or coarser portions are kept from falling on the young plants and injuring or burying them.

The beams and handles may be made in any of the usual forms, and two or more shovels may be attached to each beam.

It is obvious that, instead of the straight axle here shown, a curved or bent axle may be used to pass over high plants, and that any suitable material may be used to form the various parts of the implement.

In using my improved cultivator the team is attached to the tongue C and the implement so driven or drawn as to straddle a row of the plants, each beam E with its shovels thus passing between two rows and stirring up the soil between them. The operator walks behind and guides the shovels by his hands, holding one handle, *g*, of a beam in each hand. By this means he is able to move either plow or shovel to the right or left, as may be necessary to follow the sinuosities of the row, and prevent cutting or tearing up the plants that may happen to stand out of line, and also to run the shovels nearer to or further from the plants, as may be desired. By means of the peculiar joint by which the shovels are held upright the operator is greatly relieved, as all he has to do is simply to move them in or out to guide them aright; whereas he would otherwise be compelled to do this and, at the same time, hold them upright by main force, which is extremely laborious and tiresome to the arms and wrists.

Having thus described my invention, what I claim is—

In a straddle-row cultivator, the tongue C rigidly secured to axle B, in combination with bars D D rigidly secured to the axle, serving as braces to the tongue, and having their rear ends or two equivalent bars extended to the rear to support the plow-beams E E with their gangs of plows above the ground when required, substantially as set forth.

BENJAMIN TINKHAM.

Witnesses:
THOMAS NICHOLLS,
GEORGE PAYSON.

(43)